(12) United States Patent
Tran et al.

(10) Patent No.: US 6,198,705 B1
(45) Date of Patent: Mar. 6, 2001

(54) ERROR-TOLERANT TARGET-SECTOR SEARCH USING PREVIOUS N SECTOR ID FOR HIGH-SPEED CD

(75) Inventors: Phuc Thanh Tran, Milpitas; Son Hong Ho, Los Altos; Hung Cao Nguyen, San Jose, all of CA (US)

(73) Assignee: LSI Logic Corp., Milpitas, CA (US)

( * ) Notice: Subject to any disclaimer, the term of this patent is extended or adjusted under 35 U.S.C. 154(b) by 0 days.

(21) Appl. No.: 09/153,949

(22) Filed: Sep. 16, 1998

(51) Int. Cl.[7] .................................................. G11B 17/22
(52) U.S. Cl. ............................................ 369/32; 369/47.1
(58) Field of Search .................................. 369/32, 44.25, 369/44.28, 124, 33, 134, 47.1, 47.15, 52.1, 53.1, 60, 13; 360/78.04, 78.06, 78.11, 78.14, 51, 48

(56) References Cited

U.S. PATENT DOCUMENTS

| | | | |
|---|---|---|---|
| 4,081,844 | 3/1978 | Devore et al. | 360/48 |
| 4,694,441 | 9/1987 | Tomisawa et al. | 369/32 |
| 4,862,443 | 8/1989 | Tsuji et al. | 369/59 |
| 5,195,068 | 3/1993 | Morishima | 369/32 |
| 5,226,026 | 7/1993 | Oshiba | 369/48 |
| 5,365,382 | 11/1994 | Weng et al. | 360/51 |
| 5,420,730 | 5/1995 | Moon et al. | 360/77.08 |
| 5,604,646 | 2/1997 | Yamawaki | 360/53 |
| 5,623,460 | 4/1997 | Nagasawa et al. | 369/32 |
| 6,058,453 | * 5/2000 | Packer | 711/112 |
| 6,061,308 | * 5/2000 | Nakamizo | 369/32 |

\* cited by examiner

Primary Examiner—Ali Neyzari
(74) Attorney, Agent, or Firm—Stuart T. Auvinen (57) ABSTRACT

An optical disk controller reads CD-ROM disks at high speeds that commonly produce errors. Errors in the headers that identify sectors are tolerated by the sector-search hardware. The disk-controller firmware writes a virtual target register the previous sector's header's minutes, seconds, frame (MSF), which is one less that the desired sector's MSF, or MSF-1. A physical target that precedes the virtual target is searched for. The physical target precedes the desired sector by N sectors, so that the physical target is MSF-N. When the physical target matches a header read from the disk, a good sector found flag is set. The physical target is then incremented for each new sector and compared to the virtual target. Once the physical target matches the virtual target, the following sector is buffered to the host. The raw header from the disk is stored and error corrections are made using the error correction byte following the sector's data. The corrected raw header is compared to the virtual target to determine if the correct sector was captured. The virtual target is also incremented so that all following sectors that are transferred to the host can also have their headers checked.

20 Claims, 6 Drawing Sheets

ERROR-TOLERANT TARGET-SECTOR SEARCH USING PREVIOUS N SECTOR ID FOR HIGH-SPEED CD

FIELD OF THE INVENTION

This invention relates to optical-disk controllers, and more particularly to searching for desired sector on a CD-ROM.

BACKGROUND OF THE INVENTION

Optical disks have found widespread use in both computer and consumer electronics fields. Compact Disks (CD) were originally produced for storage of audio recordings and later adapted for use on personal computers (PCs) as CD-ROMs. Optical disks are inexpensive to produce and durable. A laser beam is deflected by small pits arranged in a continuous spiral on the disk's surface. The presence or absence of the pits as the disk spins over the laser beam is detected as binary data.

Increasing data bandwidth requirements of PCs has driven development of higher and higher speed CD-ROM readers or drives. CD-ROM drives have progresses from the original "1×" speed, to double-speed, quad-speed, 8×, 16×, and now 32× and up to 40× drives. Limitations of CD technology such as a fixed wavelength of the laser and limited error correction cause data errors at the higher speeds. While the physical data on the disk may be correct, the higher rotational and reading speeds may introduce errors. Often these higher-speed CD-ROM drives must slow down and re-read data sectors when errors are encountered. Re-reading the data defeats the benefits of higher-speed drives.

The original music CD players typically read the data in a continuous stream, following the continues spiral track of the optical disk. The data is arranged into sectors of about 2K bytes each. These sectors are identified by a header that includes an MSF field. The MSF field specifies the minutes, seconds, and frame of the musical data in the sector. Each sector has a unique MSF field, and the sectors are arranged in ascending MSF order on the optical disk.

As the CD is played, the sectors are read in sequence, from MSF=0,0,0 through the first 75 frames to MSF=0,0,75 for the first second of music, then for 75 more frames for the next second until MSF=0,1,75. This continues through 75 frames for each second, for 60 seconds, and for up to 60 minutes, until MSF=60, 60, 75.

When it is desired to skip ahead to a desired song, the MSF for the song is looked up and the CD player searches the headers for the song's MSF. Once the correct MSF is found, the CD player reads the data in the sectors following the target MSF. Because of pipelining and the continuous spinning of the disk, the target MSF is usually the MSF just before the desired song, such as MSF-1, the previous frame. For a description of track jumping, see U.S. Pat. No. 5,623,460 by Nagasawa et al., and assigned to Sanyo Electric Co.

Computer data also is stored into sectors identified by sequential MSF fields in the sector header. An index or catalog of the computer files on the disk can be used to find the MSF for a desired computer file. A CD-ROM reader can then search the headers for the target MSF, typically the previous sector, MSF-1.

For computer data, the MSF has no direct correspondence to minutes or seconds of display on a computer, but merely forms a convenient index to store the data. Since the MSF values increase in sequential order across the disk, the disk controller can move the laser inward or outward across many turns or tracks of the spiral to the approximate location of the target MSF. Then it can check for the correct M value and re-adjust the laser position if necessary, until the correct M and then S values are found, and eventually the target MSF.

Figure 1:
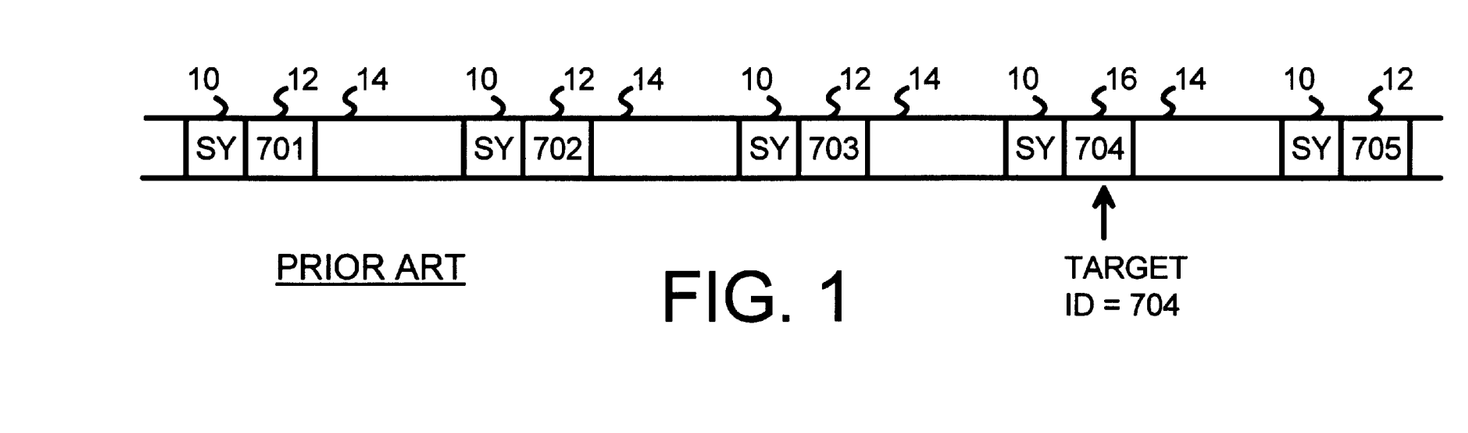
FIG. 1 illustrates a data stream read from a CD at low speeds.

MSF-1 Search—FIG. 1

FIG. 1 illustrates a data stream read from a CD at low speeds. The data stream read from the CD or CD-ROM is arranged into data sectors. Each data sector begins with a synchronizing or sync pattern 10 followed by header 12 and data 14. The sync pattern is a fixed pattern that is not found in header 12 or data 14. The sync pattern is a violation of the standard run-length-limited (RLL) coding used to encode the data and header for recording on the optical disk. Thus the sync pattern is easily identified.

Data 14 contains about 2K bytes of user data, and some error-correction information. Header 12 contains the minutes, second, frames MSF value that uniquely identifies the sector. For example, the first header 12 of FIG. 1 has an MSF of 7,0,1, which is frame 1 of second 0 of minute 7. The next has an MSF or 7,0,2, followed by the next header 7,0,3. The target header 16 has an MSF of 7,0,4. The desired data is not the data following target header 16, but rather the next new sector, with an MSF of 7,0,5. The target MSF is the desired MSF-1, the previous frame.

Figure 2:
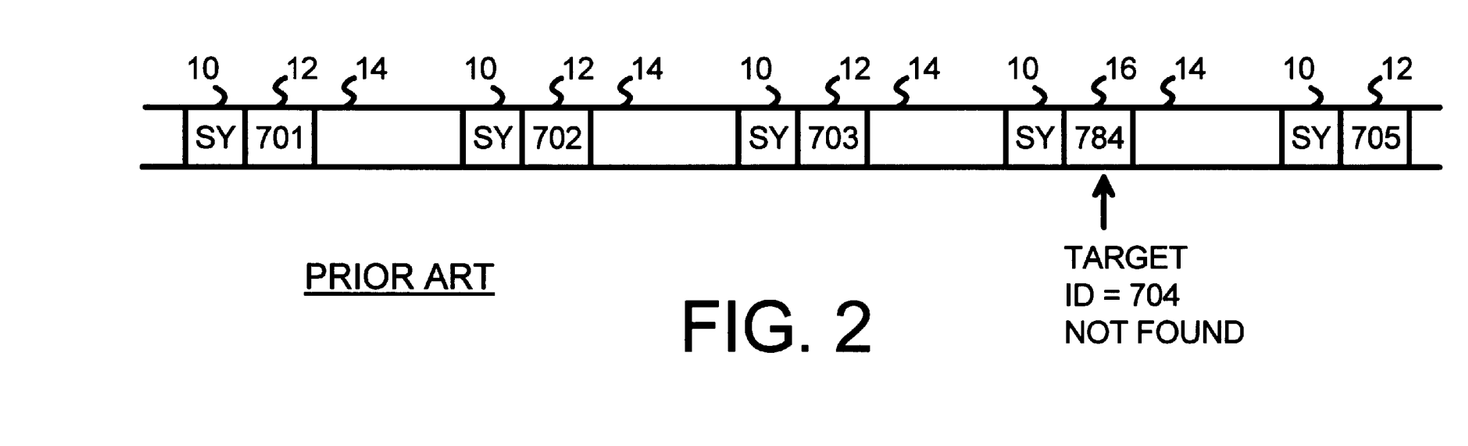
FIG. 2 highlights a MSF-1 search failure at higher speeds.

MSF-1 Search Fails at Higher Speed—FIG. 2

While searching for the target header of MSF-1 is effective at lower speeds, failures can occur at higher speeds, such as with 32× CD-ROM drives. FIG. 2 highlights a MSF-1 search failure at higher speeds.

At higher speeds, sync patterns 10 can still be found, and additional errors in data 14 caused by the higher-speed reading can often be corrected by error correction. However, header 12 must be quickly read and compared to the target MSF-1 before the next sector is reached, so that a decision to buffer the sector can be made in time. Error correction information is contained at the end of data 14 following header 12, so error correction information is not even available until just before the next sector begins.

Thus there is typically not enough time for error correction of header 12 before the next header is reached.

Errors in the header's MSF fields can cause the CD-ROM controller to miss the target MSF. For example, in FIG. 2 the target MSF in header 16 contains an error. The disk is read so fast that the MSF of 7,0,4 is instead read as 7,8,4. Since 7,8,4 does not match the target of 7,0,4, the disk controller does not find the target. After some timeout, the disk controller will have to go back and search again for the target header, perhaps reading the correct MSF of 7,0,4 on the re-try. The rotational speed of the disk may be slowed after several search failures at high speed. Once the disk spins slowly enough, the correct MSF of 7,0,4 is read as was shown in FIG. 1. Of course, such repeated searches and disk deceleration consume time and reduce performance.

What is desired is a CD-ROM drive that can operate at high speeds such as 32×. It is desired to avoid slowing the disk to re-read sector headers during a search. It is desired to search for header information at high speed despite read errors. It is desired to read headers without error correction during a sector search. An error-tolerant sector-searching controller is desired for use with high-speed CD-ROM drives. A flexible sector-search method is desired that can adapt to read errors without decelerating the disk.

SUMMARY OF THE INVENTION

An error-tolerant optical-disk controller has a physical-target register that stores a physical-target identifier. The physical-target identifier uniquely identifies a physical-target sector on an optical disk. The physical-target sector precedes a desired sector by N sectors, and N is a programmable value greater than one. The desired sector contains data to be buffered to a host.

A data stream from the optical disk is demodulated and arranged into sectors. Each sector contains a sync pattern, a header, and data. A sync-pattern detector is coupled to the data stream. It generates a sync clock when the sync pattern is detected in the data stream. A raw comparator is responsive to the sync clock. It compares a raw identifier in the header from the data stream to the physical-target identifier and activates a good-sector-found signal when a match is found.

A delay circuit is responsive to the good-sector-found signal. It waits N sectors and then activates a start-buffering signal. A buffer stores data in the desired sector for transfer to the host when the start-buffering signal is activated. Thus the physical-target sector is a programmable N sectors before the desired sector.

In further aspects of the invention the delay circuit has a virtual-target register for storing a virtual-target identifier. The virtual-target identifier uniquely identifies a virtual-target sector that precedes the desired sector by a fixed number of sectors less than N. An incrementor is coupled to the physical-target register. It increments the physical-target identifier in response to each sync clock once the good-sector-found signal is activated to generate an incremented physical identifier.

A virtual comparator is coupled to the virtual-target register. It compares the virtual-target identifier with the incremented physical identifier and activates the start-buffering signal when a match is detected. Thus the start-buffering signal is generated by a virtual compare and not a compare with the raw identifier from the data stream.

In further aspects the virtual-target sector is a sector immediately preceding the desired sector. No other sectors are between the desired sector and the virtual-target sector.

An error corrector is coupled to the buffer. It reads error-correction bytes in the data for the virtual-target sector and generates a correction for the raw identifier from the error-correction bytes. Correction means is coupled to the error corrector. It applies the correction to the raw identifier to generate a corrected raw identifier. A final compare means is coupled to receive the corrected raw identifier. It compares the corrected raw identifier to virtual-target identifier and signals that a correct sector was found when a match occurs. Thus the raw identifier is error-corrected.

In still further aspects each identifier includes a minutes field containing a minutes value, a seconds field containing a seconds value of no more than 60, and a frame field containing a frame field of no more than 75. The physical-target identifier and the virtual-target identifier are MSF identifiers that uniquely identify a sector on the optical disk.

In further aspects a pseudo-sync means is coupled to the sync-pattern detector. It generates a sync clock pulse when no sync pattern is found at an expected location in the data stream.

DETAILED DESCRIPTION

The present invention relates to an improvement in CD-ROM target-sector searching. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventor has realized that headers do not benefit from error correction and are thus a weak link for high-speed CD-ROM players. Searching of headers can fail when there is an error in the target header. Slowing down the disk is undesirable.

The inventor has realized that some bit patterns of headers may be more susceptible to high-speed read errors than other bit patterns. These headers may have repeated errors while other headers do not have errors. Simply repeating a search for these headers is not effective. However, searching for adjacent headers is effective.

Rather than search only for the sector immediately before the desired sector, the MSF-1 sector, the inventor has realized an improvement when the search-target sector is any of the preceding sectors. For example, when the MSF-1 sector has an error, the MSF-2 sector can be set as the search-target. The disk controller then skips over two sectors rather than just one before reading the data fields.

The sync patterns may be more easily detected since they use unique patterns. The disk controller can insert a dummy or pseudo sync when the sync pattern is not found. The disk controller counts bits in the data stream and inserts a pseudo sync at the expected point in the data stream when the sync pattern is not found.

The disk controller can count a programmable number of sync patterns before buffering the desired data. When the disk controller searches for MSF-4, the disk controller is programmed to count four sync patterns after the MSF-4 target is found before buffering the data.

When a target is not found, the disk controller can be reprogrammed to search for the sector before the target. A failure to find MSF-4 causes firmware to reprogram the disk controller to look for MSF-5, the previous sector.

Figure 3A:
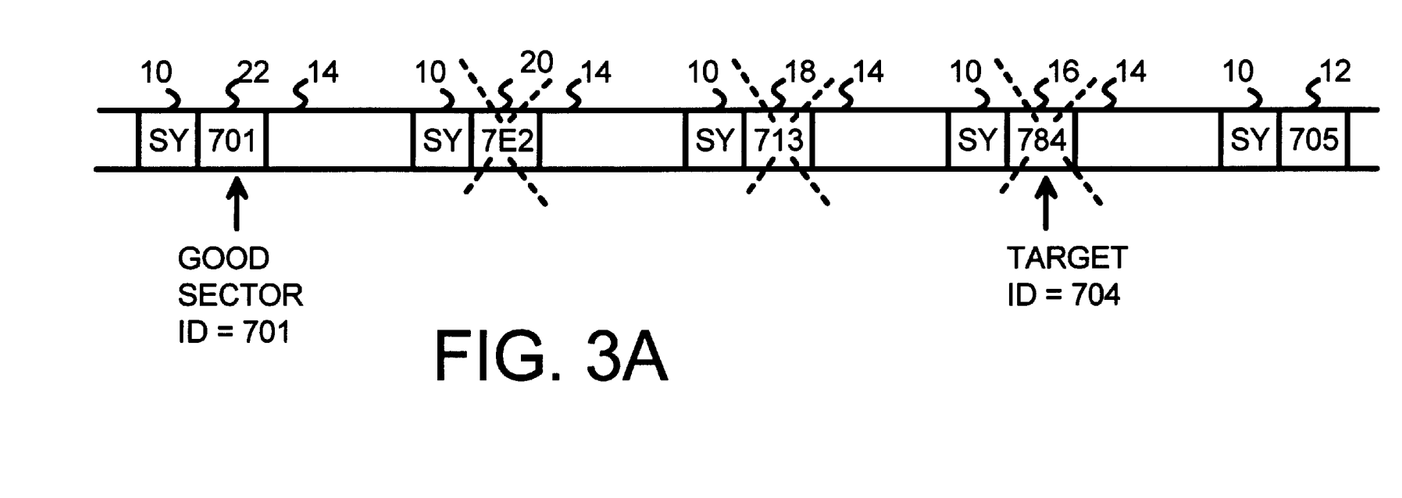
FIG. 3A shows a data stream from a CD with many header errors that can be sector-searched using a programmable MSF-N target.

Programmable Target Tolerant to Many Header Errors—FIG. 3A

FIG. 3A shows a data stream from a CD with many header errors that can be sector-searched using a programmable MSF-N target. Each sector begins with sync pattern 10 and header 12, followed by data 14. Each header contains the unique MSF value for the sector. The desired data is located after header 12 with a MSF value of 7,0,5.

The disk controller normally looks for the previous sector's MSF of 7,0,4, which is MSF-1. However, the high-speed read introduces errors in header 16 so that the MSF value of 7,0,4 is erroneously read as 7,8,4. Since 7,8,4 does not match the MSF value of 7,0,4 being searched for, the target is not found.

Firmware then re-programs the target to 7,0,3, which is MSF-2. When 7,0,3 is searched for, it also is not found, because header 18 has an error and is read as 7,1,3, not 7,0,3. The firmware then re-programs the disk controller to look for 7,0,2, which is MSF-3. Again, a read error causes header 20 to be read as 7,E,2, rather than 7,0,2. The sector with MSF=7,0,2 is thus not found.

Firmware again re-programs the target to 7,0,1, which is MSF-4. Header 22 is read correctly as 7,0,1, which matches the target programmed by the firmware. The target is found. Since the target was MSF-4, the value of parameter N is 4. The disk controller counts four (N) sync patterns 10 after target header 22 is found and then begins buffering the data. The buffered data falls alter header 12 with MSF of 7,0,5. Thus the correct data is read into the buffer for transfer to the host.

By using a programmable physical target of MSF-N, many errors in the sector headers can be tolerated. In the example of FIG. 3A, three headers 16, 18, 20 were faulty, yet the correct data sector was found.

Figure 3B:
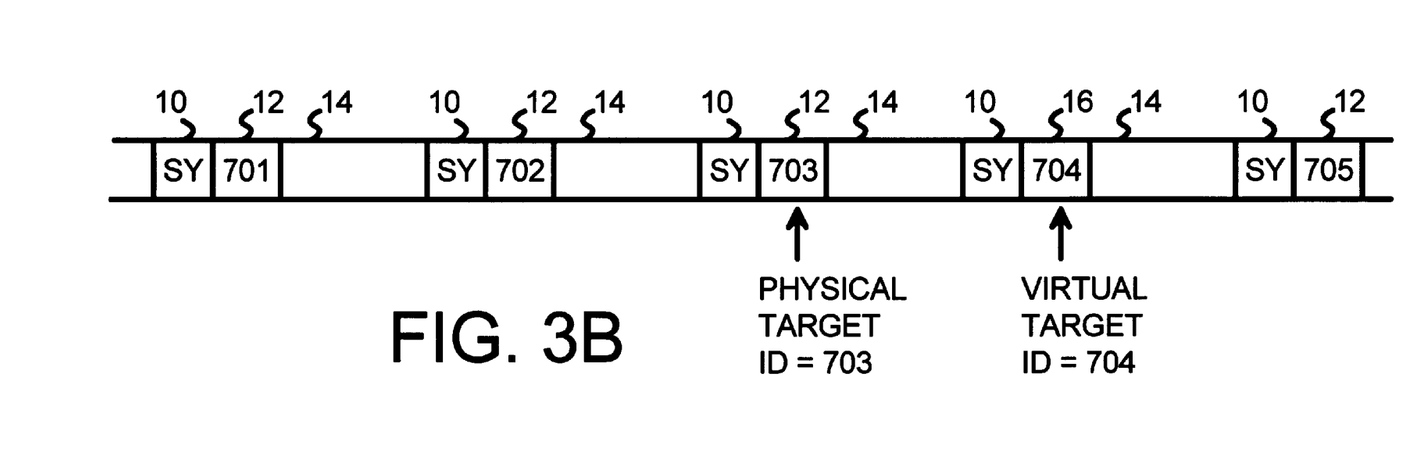
FIG. 3B is an example of a CD-ROM data stream without header errors showing virtual and physical targets.

Good Target Sector, Virtual Target—FIG. 3B

Rather than just search for MSF-N, and then count N sync patterns, the preferred embodiment uses two programmable values:

1. A good sector's MSF that is the physical target MSF-N that the disk controller searches for, and
2. A virtual target, which is always the sector before the desired data, or MSF-1.

The disk controller first searches for the physical target, the good sector's MSF. Then after the good sector's MSF is found, it increments the MSF in an internal register with each sync mark until the incremented MSF matches the virtual target.

In the nomenclature of the invention, where MSF is for sector containing the desired data, the MSF-1 sector is referred to as the virtual target, even when its header is bad and the disk controller must physically search for one of the previous headers. The virtual target identifier or virtual target ID of the MSF-1 sector is programmed into a virtual target ID register on the disk controller.

An earlier sector's MSF value is programmed into a good sector or physical target register, which is the sector the disk controller searches for. The good sector is the actual physical target the controller searches for, while the virtual target ID is the virtual target of the sector just before the data to be buffered.

When header errors occur, the physical target register is reprogrammed to search for an earlier header, while the virtual target is kept constant at the sector before the desired data.

FIG. 3B is an example of a CD-ROM data stream without header errors showing virtual and physical targets. The desired data is in the last sector, which has a MSF of 7,0,5 in its header 12. The previous sector's MSF of 7,0,4 is the virtual target ID that triggers data buffering of the next sector, which has the desired data. This virtual target ID of 7,0,4 is programmed by firmware into the virtual target ID register.

The physical target register is programmed with the MSF-N sector's header value for a preceding sector with a good header. The sector before the virtual target, MSF-2, can be initially programmed as the physical target ID. This sector has an MSF ID of 7,0,3. Thus the value 7,0,3 is programmed into the physical target register, while the value 7,0,4 is programmed into the virtual target register.

If an error occurs when reading header 12 with MSF of 7,0,3, one of the previous sector's MSF ID's can be programmed into the physical target register and the search repeated. For example, MSF 7,0,2 or 7,0,1 can be programmed into the physical target register to search for MSF-3 or MSF-4, respectively.

Figure 4:
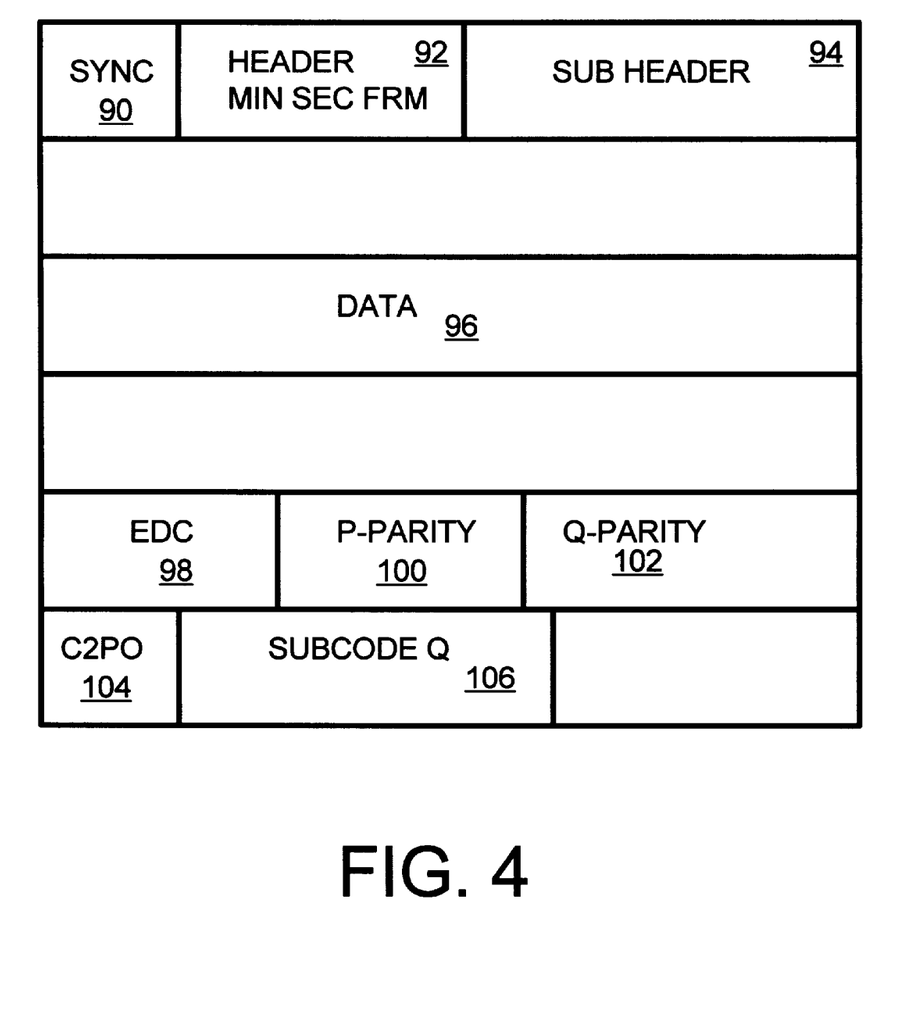
FIG. 4 is a diagram of a sector on a CD.

CD Sector—FIG. 4

FIG. 4 is a diagram of a sector on a CD. Sync field 90 contains a 12-byte sync pattern. The sync pattern is a byte of zeros, followed by 10 bytes of ones, and finally a byte of zeros. This is a unique pattern that is not found in the data or other fields of a sector. A run-length-limited RLL coding scheme known as eight-to-fourteen (EFM) modulation is used to format the physical data for the optical disk. The sync pattern is a violation of the EFM coding because of the long length or run of zeros and ones.

Immediately after the sync pattern is header field 92, which contains the MSF data. The header contains four bytes. One byte is used for the minutes (0 o 59), another byte for the seconds (0 o 59), a third byte for t he frame number (0 to 74), and a final byte for the mode. The mode defines a data type for the sector's data. The MSF bytes are each in binary-coded-decimal (BCD) for-mat.

Subheader field 94 is used for the CD-XA format extension to the CD-ROM standard. Subheader field 94 contains a file number (0 to 255), a channel number (0 to 31) of the sector, and a submode that defines global attributes of the sector.

Data field 96 contains 2352 bytes of user data. Error-detection-code EDC field 98 contains a checksum for data field 96 and other fields such as sync and header fields for mode-1, header and sub-header for mode-2. The checksum is used to detect and correct errors once primary error correction is finished. P-parity field contains Reed-Solomon error-correction bytes for rows used for a first level of error correction of data field 96, subheader field 94, and header field 92. There are 170 P-parity bytes. Q-parity field 102 contains the second level of error correction for diagonals in the sector. There are 103 Q-parity bytes. Note that both the data field 96 and header field 92 can be corrected using the error correc tion fields.

C2PO field 104 contains an additional (third) level of error correction. An error or parity flag is provided for each byte of data. A 1 means that the byte has an error while a 0 indicates no error. This information can be used by the ECC algorithm to improve the correction capability. Field 104 contains 296 bytes of error correction information. Subcode-Q field 106 contains 15 bytes for control information. The Subcode field has twelve bytes that define the kind of information track, MSF, and its checksum. The data field is padded with 4 bytes of zeros in the buffer for the host-transfer protocol.

Figure 5:
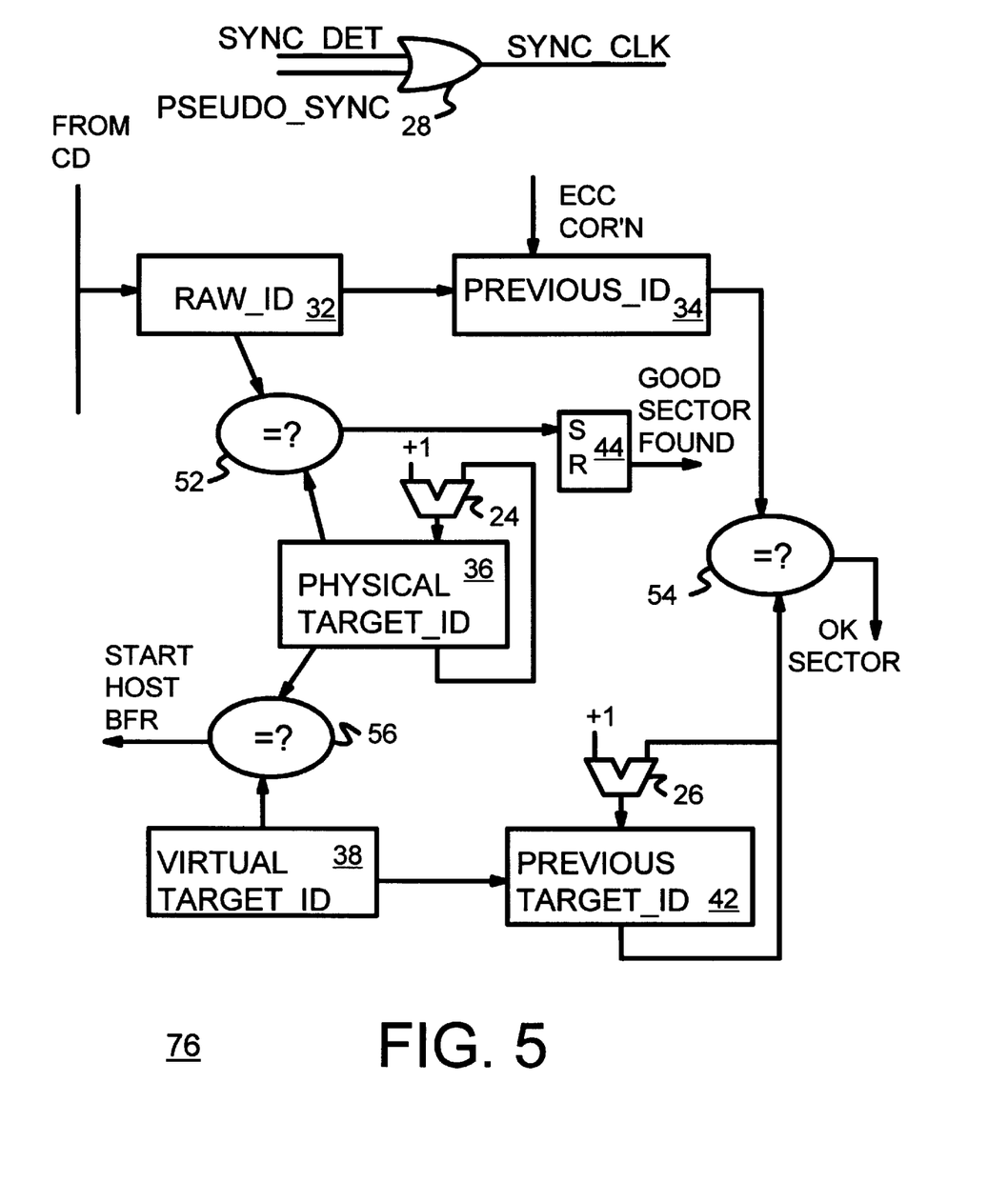
FIG. 5 is a diagram of a header comparison circuit that compares a programmable physical target but uses a virtual target to start buffering.

Header Compare With Physical and Virtual Targets—FIG. 5

FIG. 5 is a diagram of a header comparison circuit that compares a programmable physical target but uses a virtual target to start buffering. The firmware instructs the disk controller to first find any sync pattern. Once a sync pattern is found, the disk controller counts th e number of bytes in a sector (2352) and generates a dummy or pseudo sync signal if no sync pattern is found at the expected location in the data stream.

OR gate 28 generates a sync clock SYNC_CLK when either a physical sync pattern is detected in the data stream off the CD disk, or when the pseudo sync signal is generated at the expected time. This sync clock is used to clock the registers of header compare circuit 76.

The data stream from the CD is sampled by the sync clock, which latches the header that follows each sync pattern into raw ID register 32. Even when the sync pattern is not detected, and the pseudo sync signal is generated, the sync clock latches in the header. When no sync pattern is detected, it is possible that the data stream is out of sync and the header latched into raw ID register 32 is faulty. However, error correction may later correct the header, as is described later.

The firmware determines the virtual target, MSF-1, and the physical target, which is MSF-N, where MSF is the minutes, second, frame of the desired sector. The physical target is loaded by firmware into physical target register 36, while the virtual target is loaded into virtual target register 38.

Comparator 52 compares the header's MSF captured from disk and stored in raw ID register 32 with the MSF-N of the physical target stored in physical target register 36. When the raw header from the disk does not match the physical target, the current sector being read is not the target. The disk controller continues to read sectors from the disk, and at the next sync clock the next sector's header is latched into raw ID register 32. Comparison with the physical target (MSF-N) from physical target register 36 is repeated.

Each new sector read from the disk has its header latched into raw ID register 32 and compared by comparator 52 with the physical target from physical target register 36. Eventually, a match is found, or timeout occurs. When timeout occurs, perhaps do to errors in the headers read from the disk, the firmware programs a different physical target into physical target register 36 and repeats. The virtual target is not changed.

When a match is found by comparator 52, S-R latch 44 is set, setting the "good sector found" flag that indicate that the physical target, a good sector, was found. The disk controller must now count N sync clocks until the desired data arrives and can be buffered. Rather than program in a value for N and count N sectors, the inventor uses a virtual target comparison.

After the physical target has been found, new sector headers continue to be latched into raw ID register 32, but comparator 52 does not compare the header. Instead, the physical target from physical target register 36 is incremented with each sync clock after the good sector found flag is set. Incrementor 24 adds one to the frames byte of the three-byte MSF of the physical target stored in physical target register 36. When the frames is 74 and increment occurs, the seconds byte is incremented and the frames reset to zero. Likewise, when the seconds byte is 59 and increment occurs, one is added to the minutes byte, and seconds are reset to zero. Note that the MSF bytes are stored in BCD format, so incrementor 24 increments in BCD format rather than binary format, or conversion logic is used with a binary incrementor.

The physical target in physical target register 36 is thus incremented with each new sector after the physical target is found. This incrementing physical target from physical target register 36 is compared by comparator 56 with the virtual target from virtual target register 38. As the sectors are read, eventually the incrementing physical target from physical target register 36 matches the virtual target. Then comparator 56 signals the disk controller to start buffering the data. Data is captured to a buffer following the next sync clock, since the virtual target is MSF-1, the sector previous to the sector with the desired data.

Header ECC Correction and Comparison

As a double-check, the raw header captured from the data stream into raw ID register 32 is corrected during the Reed-Solomon Error-Correction process. The corrected header MSF is then compared to the virtual target programmed by firmware into virtual target register 38. When the headers match, the correct sector was found and can then be transferred to the host. A mismatch indicates some kind of error, and the data can be discarded and the header search repeated.

The raw header captured into raw ID register 32 is latched into previous raw ID register 34 on the sync clock following the start of buffering, when comparator 56 found the virtual sector. Error correction is performed on the sector's data and header while the next sector (with the desired data) is being buffered. The error correction process is completed before the next sync clock. The data in the buffer (not shown) and the header in previous raw ID register 34 are both corrected. Note that this is the MSF-1 sector that is being corrected, even though this is not the data that is to be transferred to the host.

The virtual target from virtual target register 38 is likewise latched into previous virtual target register 42 on the sync clock that follows the start of buffering signal from comparator 56. This is the programmed virtual target and is thus not susceptible to disk errors.

The previous virtual target from register 42 is compared by comparator 54 to the ECC corrected header from the disk that is stored in previous raw ID register 34. When the disk's target matches the programmed virtual target, comparator 54 sets a flag indicating that the correct sector was indeed found, allowing the data to be sent to the host. Otherwise, the desired data was not found and the search can be repeated.

Many sectors can be captured by the buffer, rather than just the desired sector. A sector count is programmed by firmware into a register on the disk controller. Once buffering begins, a current sector count is incremented for each new sector and compared with the programmed sector count. Once the incrementing sector count reaches the programmed sector count, the desired number of sectors have been stored and data capture ends.

When multiple sectors are buffered, incrementor 26 increments the MSF value in the virtual target in previous virtual target register 42 as each new sync clock occurs. Each new sync clock after the virtual target also latches the next raw header from raw ID register 32 into previous raw ID register 34. ECC correction occurs for each buffered block, correcting the header in register 34. Comparator 54 compares each new header with the incremented virtual target from register 42. Thus each sector has its header corrected and checked.

Even when only one sector is buffered, incrementor 26 can be used to check the one sector with the desired data (MSF).

Figure 6:
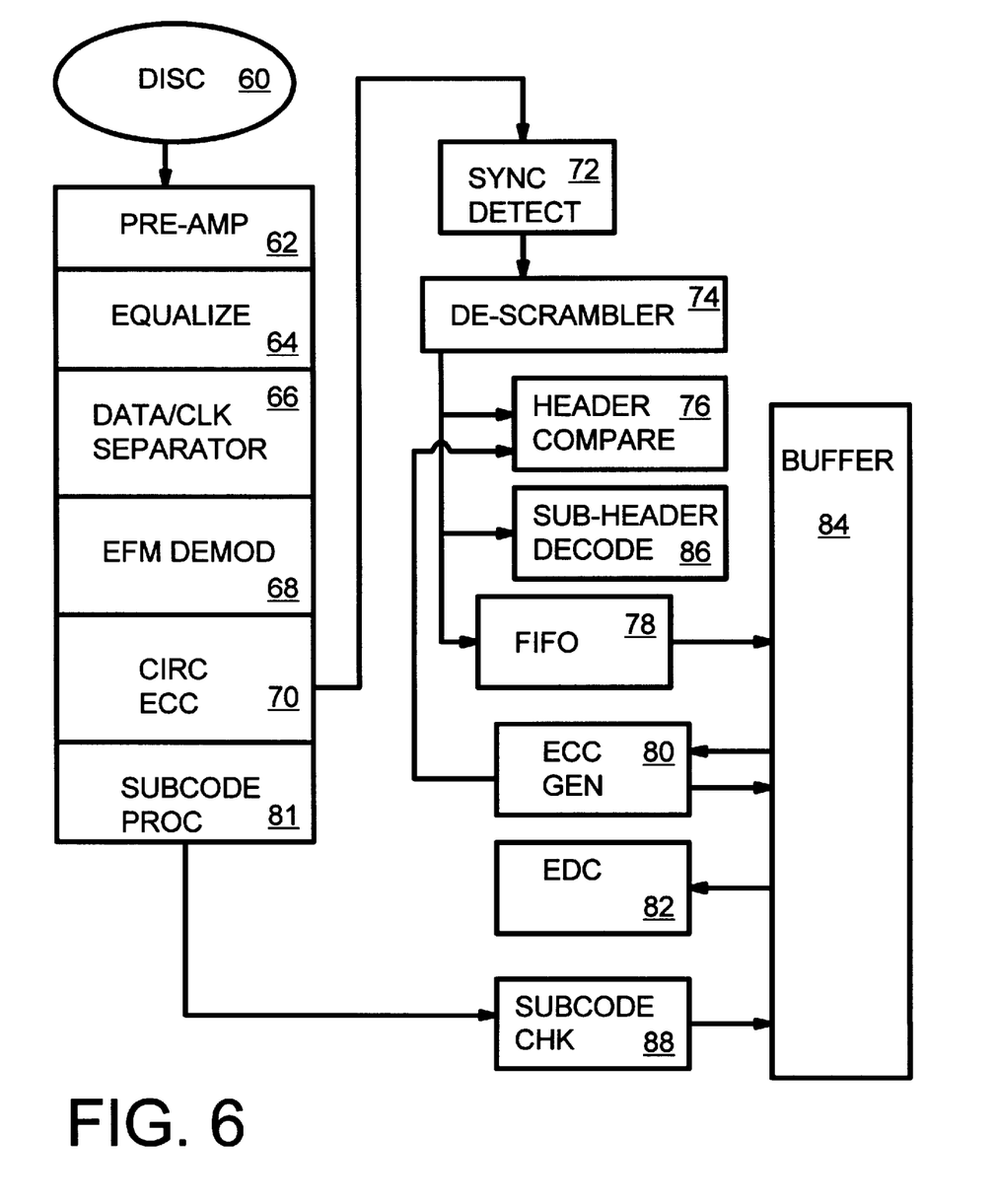
FIG. 6 is a diagram of a CD disk controller with a header compare block that searches for virtual and physical targets.

CD Disk Controller With Physical and Virtual Sector Targets—FIG. 6

FIG. 6 is a diagram of a CD disk controller with a header compare block that searches for virtual and physical targets. Disk 60 is a CD-ROM disk that responds to commands from the disk controller and feeds a data stream to pre-amp 62. Pre-amp 62 amplifies the signal from the laser as it passes over pits on the surface of the CD optical disk. Equalizer 64 adjusts the analog signal, which is separated into a clock and data by separator 66.

Demodulator 68 receives the data signal and performs eight-to-fourteen (EFM) demodulation, taking 14-bit sequences from the disk and converting them to 8-bit data bytes. Using 14 bits on the disk for each byte allows the signal to be modulated for better analog signal quality. Only 265 bit-sequences out of $2^{14}$ possible bit-sequences are used, allowing only the best-modulated bit-sequences to be chosen.

Circular ECC 70 performs a low-order error check and correction before the data stream from the disk is sent to sync detector 72. Subcode processor 81 and subcode checker 88 are used to process subcodes for mechanical control of the CD drive.

Subcodes carry sector information such as the MSF, which are usually the same as the MSF from the sector-ID header.

Sync detector 72 examines the data stream for the 14-byte sync pattern. The sync pattern is easy to detect since it is a violation of the 2,10 RRL code and does not appear in the data and header portions of sectors. Sync detector 72 generates the sync clock to header compare circuit 76 and for data-transfer control. Descrambler 74 de-scrambles the data.

Header compare circuit 76, shown in detail in FIG. 5, searches for the physical target in the headers and then increments to the virtual target. Only the physical target is compared to the error-prone data stream. The physical target can be programmed to match any of the preceding sectors, providing flexibility in target searching.

Once header compare circuit 76 finds the virtual target, it signals FIFO 78 to begin accepting data after the next sync clock from sync detector 72. The virtual target's sector is also sent from FIFO 78 to buffer 84 so it can be error-corrected to receiver the header for comparison. FIFO 78 transfers the captured data to buffer 84 for further processing before being transferred to a host. Subheader decoder 86 decodes the subheader of the desired sectors. The subheader's submode byte is used to determine the form (1 or 0) for mode 2 sectors.

The data sector stored in buffer 84 is checked for errors and the errors corrected by ECC generator 80. ECC generator 80 uses the P and Q parity bytes, and the C2 bytes to correct errors in both the data and the header of the sector. Thus the MSF in the header can be corrected.

EDC block 82 performs a final error-detection on the corrected sector after ECC generator 80 completes its correction. Once EDC block 82 determines that no errors remain, and when header compare circuit 76 has compared the corrected header to the incremented virtual target, the sector's data can be transferred from buffer 84 to the host.

Figure 7A:
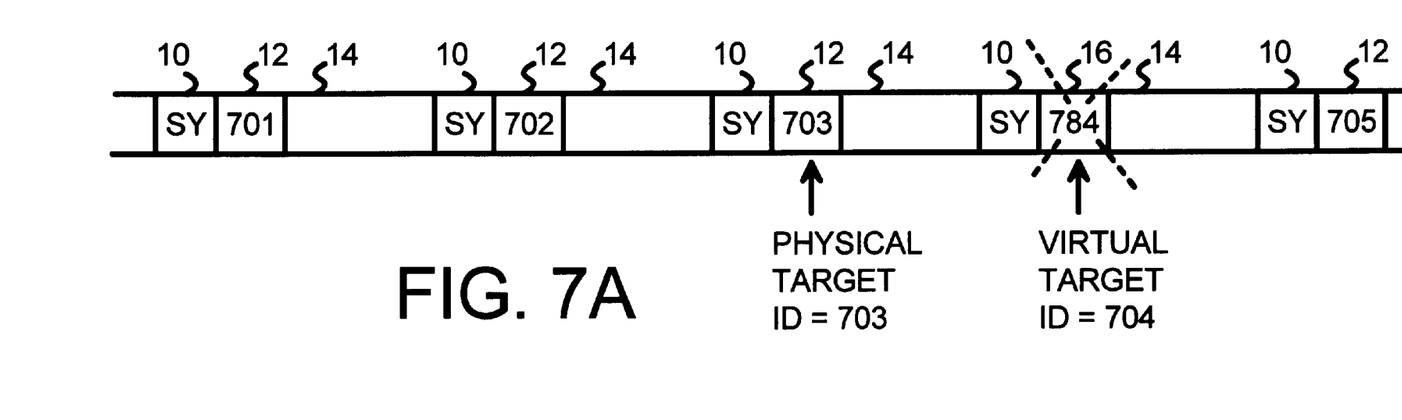
FIG. 7A highlights that the virtual target header can have errors.
Figure 7B:
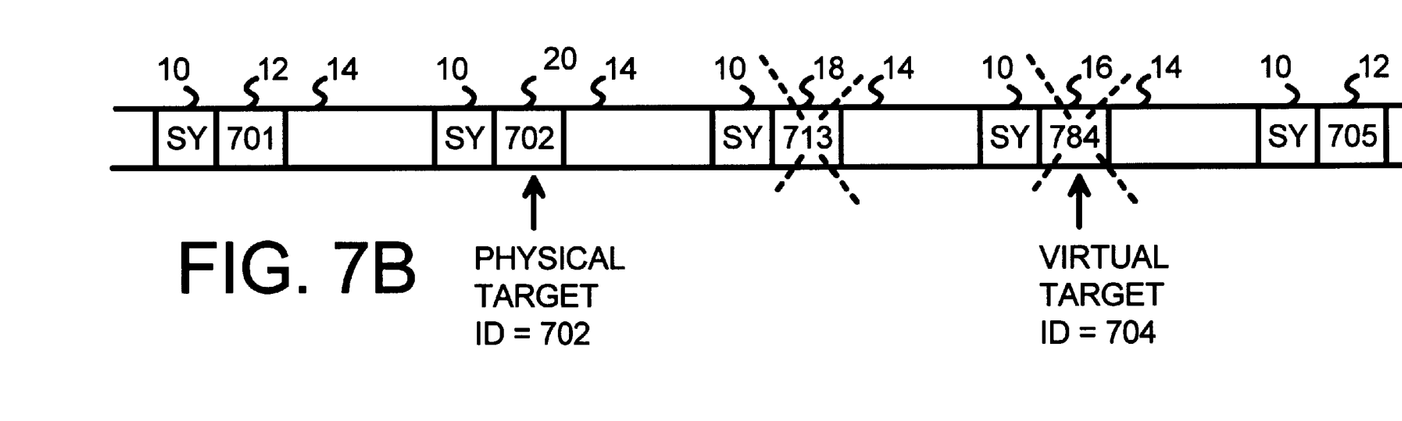
FIG. 7B highlights a double header error that is tolerated by the invention.

Examples of Header Errors Tolerated—FIGS. 7A, 7B

FIG. 7A highlights that the virtual target header can have errors. The sector before the desired data at MSF 7,0,5 is the virtual target, with a virtual MSF of 7,0,4 (desired data's MSF-1). However, read errors cause the MSF of the virtual target at header 16 to be read as 7,8,4. Since the invention does not compare the virtual target's actual header 16, the error is ignored.

Instead, the disk controller searches for the physical target of 7,0,3, which is a good sector with header 12. Once the disk controller matches the physical target, errors in the following headers are ignored.

FIG. 7B highlights a double header error that is tolerated by the invention. Not only is header 16 of the virtual target bad, but the previous sector's header 18 is also bad, being read as MSF 7,1,3 rather than 7,0,3. The firmware reprograms the disk controller's physical target register to search for sector 7,0,2. Header 20 for this sector is read correctly as 7,0,2, matching the physical target programmed into the physical target register. Thus a good sector has been found.

Each of the next sync marks increments the MSF value in the physical target register. Once the physical target register is incremented to 7,0,4, it matched the virtual target register. Data buffering is triggered to begin with the next sector's sync pattern 10. Even when header 12 of the desired sector is bad, the correct data is found. Error correction can later correct the header to confirm that the correct data was buffered.

Thus the invention tolerates errors in the virtual target's header, and in previous sector's headers. Even errors in the desired sector's header are tolerated and later corrected.

Advantages of the Invention

A CD-ROM drive can operate at high speeds such as 32× or above by comparing both a physical and a virtual target header. Slowing the disk to re-read sector headers during a search is avoided since the physical target can be reprogrammed to another previous sector when a search fails. Searching for header information at high speeds can thus occur despite read errors. Headers are read and compared without error correction during a sector search. An error-tolerant sector-searching controller is useful with high-speed CD-ROM drives. A flexible sector-search method adapts to read errors without decelerating the disk.

The physical target can be programmed to match any of the preceding sectors, providing flexibility in target searching. The firmware can reprogram just the physical target when a search fails, and still find the same virtual target desired by the host. Efficient use is made of the memory since the firmware does not have to buffer at an earlier location in order to get around an erroneous header. Thus the desired data can be found using a range of physical targets. Failures or errors in one or many headers can be circumvented, allowing the desired sector to be found, even when the desired sector's header contains an error. Error-correction on the header allows the actual header read to be checked against the desired sector to confirm that he right data sector was read.

Alternate Embodiments

Several other embodiments are contemplated by the inventors. For example the CD disk controller can be combined with a DVD controller that uses a different method to search for DVD blocks. Other embodiments of the logic, registers, and comparators are possible within the spirit of the invention. Logic may be implemented by synthesis tools from hardware-design-language HDL code. Pipelining can be varied by adding or removing staging registers. Clocks are often qualified or gated with other signals. The raw ID register can store all four bytes of the header, or just the three MSF bytes.

Many sectors can be captured by the buffer, rather than just the desired sector. A sector count is programmed by firmware into a register on the disk controller. Once buffering begins, a current sector count is incremented for each new sector and compared with the programmed sector count. Once the incrementing sector count reaches the programmed sector count, the desired number of sectors have been stored and data capture ends.

The virtual target could be the desired sector itself for systems with a different pipeline. Also, the virtual target could be two or more sectors before the desired sector for systems with deeper pipelines. Thus the virtual target is not limited to MSF-1. The actual target may be programmed as the virtual target +1; then the data starts being buffered at the programmed target sector rather than the sector after the target.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. An error-tolerant optical-disk controller comprising:
    a physical-target register for storing a physical-target identifier, the physical-target identifier uniquely identifying a physical-target sector on an optical disk;
    wherein the physical-target sector precedes a desired sector by N sectors wherein N is a programmable value greater than one, the desired sector containing data to be buffered to a host;
    a data stream from the optical disk, the data stream being demodulated and arranged into sectors, each sector containing a sync pattern, a header, and data;
    a sync-pattern detector, coupled to the data stream, for generating a sync clock when the sync pattern is detected in the data stream;
    a raw comparator, responsive to the sync clock, for comparing a raw identifier in the header from the data stream to the physical-target identifier and activating a good-sector-found signal when a match is found;
    a delay circuit, responsive to the good-sector-found signal, for waiting N sectors and then activating a start-buffering signal; and
    a buffer, for storing data in the desired sector for transfer to the host when the start-buffering signal is activated,
    whereby the physical-target sector is a programmable N sectors before the desired sector.

2. The error-tolerant optical-disk controller of claim 1 wherein the delay circuit comprises:
    a virtual-target register for storing a virtual-target identifier, the virtual-target identifier uniquely identifying a virtual-target sector that precedes the desired sector by a fixed number of sectors less than N;
    an incrementor, coupled to the physical-target register, for incrementing the physical-target identifier in response to each sync clock once the good-sector-found signal is activated to generate an incremented physical identifier; and
    a virtual comparator, coupled to the virtual-target register, for comparing the virtual-target identifier with the incremented physical identifier and activating the start-buffering signal when a match is detected,
    whereby the start-buffering signal is generated by a virtual compare and not a compare with the raw identifier from the data stream.

3. The error-tolerant optical-disk controller of claim 2 wherein the virtual-target sector is a sector immediately preceding the desired sector, wherein no other sectors are between the desired sector and the virtual-target sector.

4. The error-tolerant optical-disk controller of claim 2 further comprising:
    an error corrector, coupled to the buffer, for reading error-correction bytes in the data for the virtual-target sector and generating a correction for the raw identifier from the error-correction bytes;
    correction means, coupled to the error corrector, for applying the correction to the raw identifier to generate a corrected raw identifier; and
    final compare means, coupled to receive the corrected raw identifier, for comparing the corrected raw identifier to virtual-target identifier and signaling that a correct sector was found when a match occurs,
    whereby the raw identifier is error-corrected.

5. The error-tolerant optical-disk controller of claim 2 wherein each identifier includes a minutes field containing a minutes value, a seconds field containing a seconds value of no more than 60, and a frame field containing a frame field of no more than 75, the physical-target identifier and the virtual-target identifier being MSF identifiers that uniquely identify a sector on the optical disk.

6. The error-tolerant optical-disk controller of claim 2 further comprising:
    pseudo-sync means, coupled to the sync-pattern detector, for generating a sync clock pulse when no sync pattern is found at an expected location in the data stream.

7. A header compare circuit for searching a compact-disk CD optical disk for a desired sector, the header compare circuit comprising:
    a sync clock for indicating a start of a new sector;
    a data stream input from the CD optical disk;
    a raw-header register, coupled to the data stream input, for storing a raw identifier for a current sector from the data stream in response to the sync clock;
    a physical-target register, programmed with a physical target that includes a physical identifier;
    a virtual-target register, programmed with a virtual target, the virtual target having a virtual identifier for a sector that precedes the desired sector;
    a physical-target comparator, coupled to the raw-header register and the virtual-target register, for generating a good-sector-found signal when the raw identifier matches the physical identifier in the physical-target register;
    a physical-target incrementor, coupled to the physical-target register and responsive to the good-sector-found signal, for incrementing the physical identifier in response to the sync clock after the good-sector-found signal is generated, the physical-target incrementor generating an incremented physical identifier; and
    a virtual-target comparator, coupled to the physical-target register and the virtual-target register, for generating a start-buffer signal when the incremented physical identifier matches the virtual identifier,
    whereby the start-buffer signal is generated by a virtual-target compare rather than a compare with the raw identifier from the data stream from the CD optical disk.

8. The header compare circuit of claim 7 wherein the virtual target identifies the desired sector.

9. The header compare circuit of claim 7 wherein the virtual target identifies a virtual-target sector immediately before the desired sector with no other sectors between the virtual-target sector and the desired sector.

10. The header compare circuit of claim 7 wherein the physical identifier, the virtual identifier, and the raw identifier each further comprise a minutes field, a seconds field, and a frames field.

11. The header compare circuit of claim 10 wherein the minutes field is a binary-coded-decimal BCD byte, and the seconds field is a BCD byte, and the frames field is a BCD byte.

12. The header compare circuit of claim 11 wherein:
    MSF is a minutes, seconds, frames value for an identifier in a header of the desired sector;
    the virtual identifier is always the previous sector that has the virtual identifier of MSF-1;
    the physical identifier is for one of several previous sectors, the physical identifier has an identifier of MSF-N, where N is a programmable number of sectors that a physical-target sector precedes the desired sector.

13. The header compare circuit of claim 7 further comprising:

a previous raw-header register, coupled to the raw-header register, for storing a previous raw identifier while error correction occurs;

a previous virtual-target register, coupled to the virtual-target register, for storing a previous virtual identifier;

an error corrector, receiving error correction bytes following data bytes in a previous sector, for correcting errors in the previous raw identifier stored in the raw-header register to generate a corrected raw identifier; and a final comparator, coupled to the previous raw-header register and to the previous virtual-target register, for comparing the corrected raw identifier to the previous virtual identifier and signaling a valid sector when a match occurs, whereby raw headers are checked after error correction.

14. The header compare circuit of claim 13 further comprising:

a previous incrementor, coupled to the previous virtual-target register, for incrementing the previous virtual identifier in response to the sync clock, whereby raw headers for multiple sectors are checked.

15. The header compare circuit of claim 14 wherein the sync clock is generated when a sync pattern is detected in the data stream or when no sync pattern is detected at an expected point in the data stream at the end of a sector, whereby pseudo syncs are inserted when no sync pattern is detected.

16. An error-tolerant method for searching for a desired sector on an optical disk, the desired sector having a minutes, seconds, frame (MSF) identifier of $MSF_0$, the method comprising:

programming a physical target register with an MSF identifier, the physical target register storing a $MSF_0$-N identifier for a sector preceding the desired sector by N sectors;

wherein N is a programmable number of sectors before the desired sector;

detecting a sync pattern;

generating a sync clock after each sync pattern is detected;

extracting a raw header from the optical disk after a sync pattern is detected, the raw header containing a raw MSF identifier for data following the raw header;

comparing the raw MSF identifier from the raw header to the $MSF_0$-N identifier from the physical target register and signaling a good-sector when a match occurs; and waiting for N sectors and then buffering the desired sector, whereby a physical target searched for is a programmable number N of sectors before the desired sector.

17. The error-tolerant method of claim 16 further comprising:

programming a virtual target register with a MSF identifier, the virtual target register storing a $MSF_0$-1 identifier for a sector immediately preceding the desired sector;

incrementing the $MSF_0$-N identifier with each sync clock after the good-sector is signaled to produce an incremented MSF identifier;

comparing the incremented MSF identifier with the $MSF_0$-1 identifier;

signaling a start to data buffering of the desired sector when the incremented MSF identifier matches the $MSF_0$-1 identifier, whereby the raw MSF identifier is compared with a physical target, then the incremented MSF identifier is compared with a virtual target.

18. The error-tolerant method of claim 17 further comprising:

when the raw MSF identifier for a $MSF_0$-N sector contains an error and the good-sector is not signaled due to the error:

re-programming the physical target register with a different $MSF_0$-N identifier for a different sector preceding the desired sector; and comparing the raw MSF identifier from the raw header to the different $MSF_0$-N identifier from the physical target register and signaling a good-sector when a match occurs, whereby the physical target register is re-programmed when the raw MSF identifier of the physical target contains an error.

19. The error-tolerant method of claim 18 further comprising:

converting 14-bit groups of bits read from the optical disk into 8-bit bytes of header, data, or sync patterns using eight-to-fourteen EFM demodulation, whereby the data stream from the optical disk is EFM demodulated into bytes.

20. The error-tolerant method of claim 18 further comprising:

reading all data and error correction bytes in a current sector;

correcting errors in the current sector including an error in the raw MSF identifier to produce a corrected header; and comparing the corrected header to the $MSF_0$-1 identifier to determine when the desired sector was found, whereby the raw MSF identifier is corrected and checked against the $MSF_0$-1 identifier.

* * * * *